Sept. 18, 1928.  
W. A. SIMMONS  
1,684,418
GLARE SHADE
Filed Feb. 21, 1927
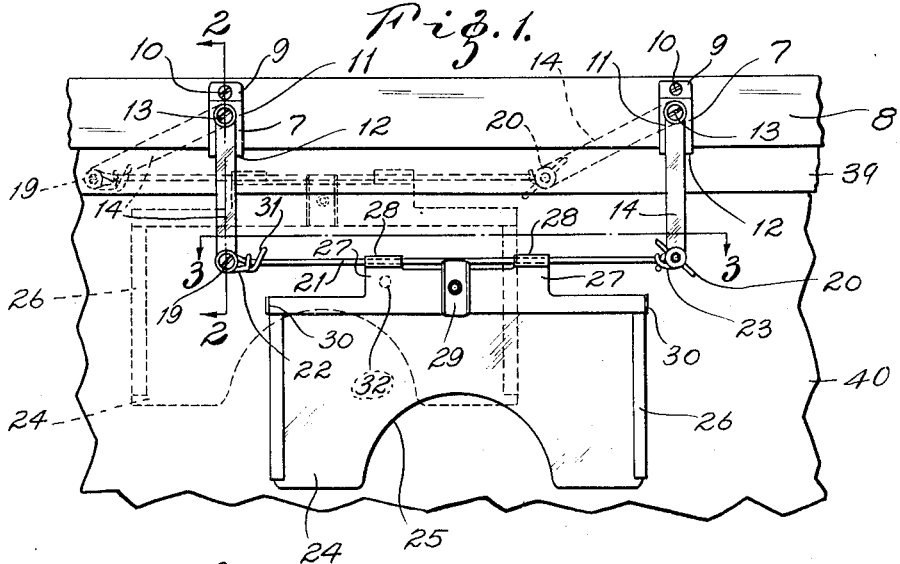
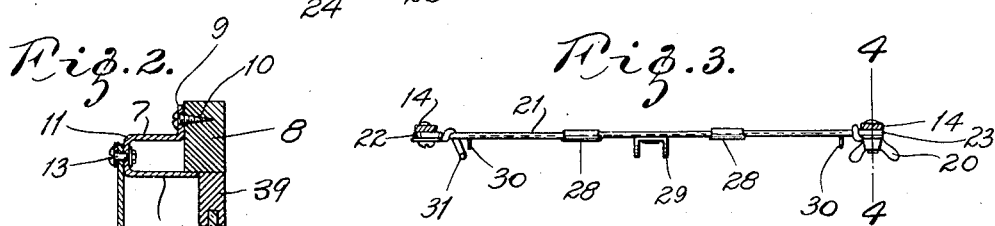
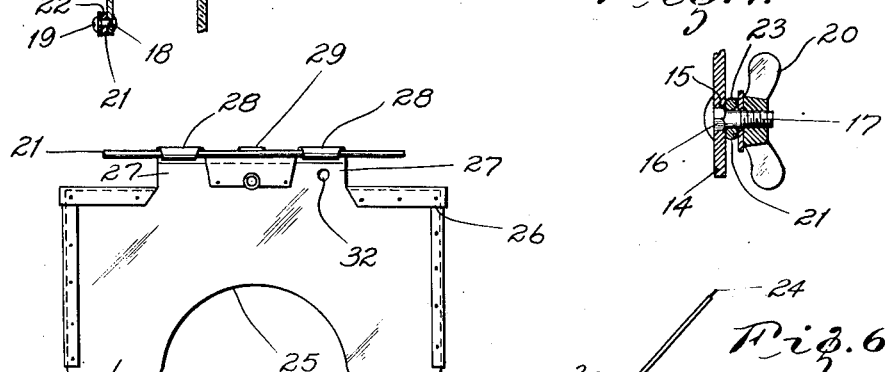
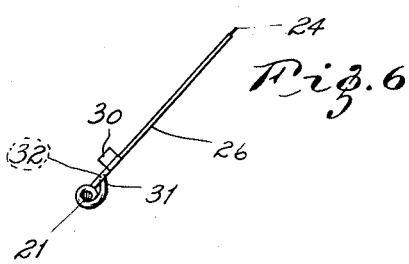
INVENTOR:
WILLIAM A. SIMMONS
By Edward E. Longan
ATTORNEY.

Patented Sept. 18, 1928.

1,684,418

UNITED STATES PATENT OFFICE.

WILLIAM A. SIMMONS, OF ELDON, MISSOURI, ASSIGNOR TO SIMMONS GLARE SHIELD COMPANY, OF ELDON, MISSOURI, A CORPORATION OF MISSOURI.

GLARE SHADE.

Application filed February 21, 1927. Serial No. 169,782.

My invention relates to improvements in glare shades, and has for its primary object a shield or shade designed to prevent the driver of an automobile from becoming blinded by the glare of headlights from an approaching vehicle.

A further object is to construct a glare shield or shade which, when once attached, is readily adjustable for different drivers.

A still further object is to construct a device for dimming the glare of approaching automobile headlights which, when not in use, can be readily moved out of the way and without changing any of its adjustments.

In the drawings:

Fig. 1 is a fragmental view of the upper portion of the front of an automobile with my device attached thereto;

Fig. 2 is a cross section taken on the line 2—2 of Fig. 1;

Fig. 3 is a cross section taken on the line 3—3 of Fig. 1;

Fig. 4 is an enlarged section taken on the line 4—4 of Fig. 3;

Fig. 5 is a front face view of the shade; and

Fig. 6 is a fragmental edge view showing the manner of supporting the shade when the same is not in use.

In carrying out my invention I employ a pair of brackets 7 which are designed to be attached to the frame 8 of a motor vehicle. This frame 8 is that part of the vehicle in which the windshield frame is mounted. The brackets 7 are provided with perforated ears 9 so that they can be attached to the frame 8 by means of screws 10. The brackets 7 are preferably U shaped with the portion 11 extending inwardly so as to be spaced from the frame 8. In this way the shade will not interfere in any manner with a windshield wiper. The lower leg 12 of the brackets 7 extends underneath the frame 8 as illustrated in Fig. 2 and serves as a guide so that the brackets can be properly aligned horizontally when they are attached.

The portion 11 of each of the brackets is provided with a bore through which a bolt or screw 13 extends, and pivotally supported by these screws are links or arms 14. These links are supported by the screws or bolts 13 at their upper ends, one of the links 14 is provided at its lower end with a square opening 15, which receives the square shoulder 16 of a bolt 17. The other of the links 14 is provided with a screw threaded bore 18 in which a screw 19 is seated. This screw is only partially screw threaded so that it can be inserted a predetermined distance only. The purpose of this will be explained in detail later. The bolt 17 is also only partially screw threaded and carries a thumb nut 20. Carried by the arms 14 is a bar or support 21. This bar may be made either of round material, such as heavy wire as illustrated in the drawing, or it may have its ends flat and perforated. The ends 22 and 23 are so positioned that the screw 19 will pass through the end 22, and the bolt 17 through the end 23. The screw 19 however does not clamp the end 22 tightly against the bar or arm 14 but secures it in such a manner that it can pivot thereon. The end 23 however is designed to be clamped tightly against the bar 14 which carries it and when so tightened prevents any swinging of the links or bars 14. 24 represents the glare shield or shade, which is preferably of colored translucent material, such as celluloid or the like. This shade is provided with an arcuate cutaway portion 25 in its lower edge. The shade is provided on two sides and on its top edge with a frame 26 which lends rigidity to the shade. The lower edge of the shade however projects beyond the lower edge or end of the side members of the frame so that in the event the shade swings, the metal, of which the frame is constructed, will not strike the windshield and cause a rattling.

Carried by the upper or top portion of the frame are ears 27 which are provided with eyes 28, these eyes fitting snugly over the rod 21. The upper portion of the frame also carries a member 29 which is preferably pivotally mounted and which is designed to bear rather strongly against the bar 21 so as to frictionally engage therewith and prevent the frame and shade from swinging too freely or from sliding back and forth. It is to be understood, however, that this friction is not great enough to prevent the shade from being moved back and forth on the bar by hand or to prevent its being tilted upward when it is desired to place the shade out of use, the friction being only great enough to prevent rocking or sliding due to vibration etc. when the vehicle is in movement. The upper edge of the frame is also provided with ears 30. These ears are located at each end of the frame and project inwardly toward the driver of the vehicle and are for the purpose of permitting engagement with the fingers so that the shield can be slid along the bar 21.

The installation and operation of my device is as follows:

After the various parts of the device have been assembled and it is desired to attach the shade to a motor vehicle, the brackets 9 are placed in position with the arm 12 contacting with the underside of the frame 8. The screws 10 are then secured. The device will now be in the position indicated by solid lines in Fig. 1, which is the lowest position for the device and is designed for short drivers. In the event a tall person is driving the machine and it is desired to raise the shade so as to adjust it properly for his vision, the thumb nut 20 is loosened and the arms 14 swung either to the right or left. This swinging of the arms will raise the shade as indicated by dotted lines in Fig. 1. When the proper height has been obtained the thumb nut 20 is tightened binding the end 23 tightly against the bar 14 which supports it. This locks the device in position and prevents any further swinging of the arms. Then if the shade is not in proper alignment horizontally with the driver, the shade can be moved to right or left on the bar 21 as desired. It will be noted from Fig. 1 that the end 22 of the bar 21 is provided with an upwardly extending projection 31. This projection is designed to enter an opening or detent 32 formed in the frame 26 or in the upper portion thereof, and when the shield or shade is to be so positioned as to be out of line of the operator or driver, the lower end of the shade is swung up and the shade is moved over so that the end 31 can enter the detent. This holds the shade in the position illustrated in Fig. 6, and consequently it will not interfere with the vision of the driver so that when driving in the daytime there will be no interfering with the driver's vision.

The cutaway portion 25 also assists greatly in night driving in that when the shield is in operative position the driver of the vehicle can look through this cutaway portion and have an unobstructed view of the road, but when a car approaches he need only move his head slightly and get full protection against the glare of oncoming lights. Heretofore I have observed that in all glare shades or anti-glare devices it was necessary, if the driver did not want to look through them, to move his head a considerable distance, causing him to assume an awkard position at the wheel. With my device however this is unnecessary because as aforesaid the cutaway portion permits clear vision of the road without the driver assuming any unnatural position. In fact the only time the driver need assume a slightly strained position is for the few seconds in which he is passing an oncoming car with bright headlights.

My device is also useful for driving early in the morning and late in the evening, as it frequently happens that the sun is in such a position that the ordinary sun visor will not shade the driver's eyes sufficiently, and it is at this time that my device will prove a great benefit to the driver.

Having fully described my invention, what I claim is:—

1. A glare shade comprising a pair of brackets adapted to be secured to a frame in spaced apart horizontal alignment to each other, a link pivotally carried at one end by each of said brackets and capable of being moved from side to side, a rod pivotally carried by said links at their lower ends, means for locking said rod and links against movement, a frame slidably carried by said rod, and a sheet of translucent material carried by said frame.

2. A glare shade comprising a pair of brackets adapted to be secured to a frame in spaced apart horizontal alignment to each other, a link pivotally carried at one end by each of said brackets, a rod pivotally carried by said links at their lower ends, means for locking said rod and links against movement, a sheet of translucent material slidably carried by said rod, and means for holding said translucent material against accidental sliding.

3. A glare shade comprising a pair of brackets adapted to be secured to a frame in spaced apart horizontal alignment to each other, a link pivotally carried at one end by each of said brackets, a rod pivotally carried by said links at their lower ends, means for locking said rod and links against movement, a sheet of translucent material slidably carried by said rod, and friction means for holding said translucent material against sliding.

4. A glare shade comprising a pair of brackets adapted to be secured to a frame in spaced apart horizontal alignment to each other, a link pivotally carried at one end by each of said brackets, a rod pivotally secured at its ends to the lower ends of said links, means for locking said rod and links against movement, a sheet of translucent material having an arcuate cutaway portion in its lower edge, a frame secured to said translucent sheet along its top and side edges means for slidably securing said frame to said rod, friction means for holding said frame against accidental sliding on said rod, and means carried by said rod for holding said frame and translucent material in raised position.

5. A glare shade comprising a pair of supports adapted to be secured to the windshield of an automobile in spaced apart horizontal alignment, a link carried by each of said supports, said links secured to the support at their upper ends, a rod pivotally secured to said links at their lower ends, means for locking said rod and links against movement, a sheet of translucent material slidably carried by said rod, and means adapted to frictionally engage said rod for holding said translucent material against movement.

In testimony whereof I have affixed my signature.

WILLIAM A. SIMMONS.